United States Patent Office 3,110,734
Patented Nov. 12, 1963

3,110,734
PROCESS OF MAKING NUCLEARLY UNSATURATED IONONE AND IRONE
Walter Kimel, Highland Park, N.J., and Marc Montavon, Basel, Switzerland, assignors to Hoffmann-La Roche Inc., Nutley, N.J., a corporation of New Jersey
No Drawing. Original application Mar. 1, 1960, Ser. No. 11,969, now Patent No. 3,021,359, dated Feb. 13, 1962. Divided and this application Sept. 13, 1961, Ser. No. 137,747
Claims priority, application Switzerland Mar. 20, 1959
2 Claims. (Cl. 260—587)

This invention relates to novel chemical compounds, novel processes of making the same and novel processes of using the same.

This application is a division of our copending application Serial No. 11,969, filed Mar. 1, 1960, now U.S. Patent No. 3,021,359.

The novel compounds of the invention can be defined as esters of lower alkanoic acids with certain enols having conjugated unsaturation. More particularly, the novel esters of the invention can be defined as esters selected from the group consisting of 2-lower alkanoyloxy-6,10-dimethyl-2,4,6,9-undecatetraene and 2-lower alkanoyloxy-6,9,10-trimethyl - 2,4,6,9 - undecatetraene, as exemplified particularly by 2-acetoxy-6,10-dimethyl-2,4,6,9-undecatetraene and 2-acetoxy - 6,9,10 - trimethyl-2,4,6,9-undecatetraene.

The invention further provides methods of making the esters discussed above. Briefly, these methods comprise reacting 6,10-dimethyl-3,5,9-undecatrien-2-one or 6,9,10-trimethyl-3,5,9-undecatrien-2-one, respectively, with an isopropenyl lower alkanoate in the presence of an acidic esterification catalyst. Whereas any of the conventional esterification catalysts can be used, such as sulfuric acid, hydrogen chloride or boron trifluoride, it is preferred to employ p-toluenesulfonic acid. Whereas any isopropenyl lower alkanoate can be employed (e.g., isopropenyl acetate, isopropenyl propionate and the like), it is preferred to use isopropenyl acetate.

The invention further provides methods of usefully applying 2-lower alkanoyloxy-6,10-dimethyl-2,4,6,9-undecatetraene and 2-lower alkanoyloxy-6,9,10-trimethyl-2,4,6,9-undecatetraene in the synthesis of nuclearly unsaturated ionones, e.g., α- and β-ionone as to the first ester mentioned and α- and β-irone as to the second ester mentioned. Briefly, these methods comprise treating 2-lower alkanoyloxy - 6,10 - dimethyl - 2,4,6,9 - undecatetraene or 2-lower alkanoyloxy-6,9,10-trimethyl-2,4,6,9-undecatetraene, respectively, with an acidic cyclizing agent. Any of the known acidic cyclizing agents can be used which have previously been employed for ring closure of acyclic ketones to produce nuclearly unsaturated ionones; illustrative of such acidic cyclizing agents are sulfuric acid, phosphoric acid, boron trifluoride and the like. The proportion of α- to β-ionone structure, in the cyclization product produced by the processes of the invention, depends upon the specific cyclizing agent and the cyclization conditions employed, in the same manner as previously known for the cyclization of an acyclic ketone to produce nuclearly unsaturated ionones. Thus, end-product ketones having predominantly a β-ionone-type structure are obtained upon treating 2-lower alkanoyloxy-6,10-dimethyl-2,4,6,9-undecatetraene or 2-lower alkanoyloxy - 6,10 - trimethyl - 2,4,6,9 - undecatetraene, respectively, with concentrated sulfuric acid in the cold. On the other hand, when employing syrupy phosphoric acid as the acidic cyclizing agent, at room temperature or at temperatures moderately elevated above room temperature, there are obtained cyclic ketone end-products having predominantly an α-ionone-type structure.

An advantageous mode of effecting the cyclization processes of the invention comprises operating in a heterogeneous (two phase) system wherein one phase consists essentially of an aqueous solution of the acidic cyclizing agent (e.g., phosphoric acid) and a second phase consists essentially of a lower saturated aliphatic hydrocarbon; such a cyclization system being taught in United States Patent 2,877,271.

The invention is further disclosed in the following examples, which are illustrative but not limitative thereof. Temperatures are stated in degrees centigrade.

Example 1

A mixture of 6,10-dimethyl-3,5,9-undecatrien-2-one, i.e., pseudoionone (192.3 g.), isopropenyl acetate (200 g.) and p-toluene-sulfonic acid (1 g.) was heated to reflux in a flask connected to a fractionation column. Acetone was removed slowly until the distillation temperature reached 82° C. The reaction mixture was then cooled to room temperature, and was washed with aqueous sodium bicarbonate solution and water until neutral. Finally, the product was isolated by distillation. 2-acetoxy-6,10-dimethyl - 2,4,6,9-undecatetraene was obtained in yield of 148 g. (63%); B.P. 112–115° C. (0.2–0.25 mm.); $n_D^{25}$ 1.532–1.537.

Example 2

2 - acetoxy - 6,9,10 - trimethyl - 2,4,6,9 - undecatetraene was prepared from 6,9,10-trimethyl-3,5,9-undecatrien-2-one, i.e., pseudoirone (412 g.), isopropenyl acetate (400 g.) and p-toluene-sulfonic acid (2 g.) in the same manner described in Example 1. The product was obtained in yield of 316 g. (62%); B.P. 114–119° C. (0.2 mm.); $n_D^{25}$ 1.530–1.537.

Example 3

To 85% phosphoric acid (72 cc.), cooled to 0°, was added dropwise, 2-acetoxy-6,10-dimethyl-2,4,6,9-undecatetraene (30.0 g.). The time of addition required was 10 minutes. Stirring was continued for 20 minutes at 0°, and then for 15 minutes at 40°. Finally, the mixture was poured onto ice water, and extracted with ether. The ether solution was washed neutral, dried and distilled. α-Ionone was obtained in yield of 9.0 g. (36.5%); B.P. 85–91° (1.0 mm.); $n_D^{25}$ 1.497–1.500; 4-phenylsemicarbazone, M.P. 187° (unchanged on admixture with an authentic sample).

Example 4

To a well-stirred mixture of 65% sulfuric acid (336 g.) and n-hexane (336 cc.) was added, during 35 minutes, at 10°, a solution of 2-acetoxy-6,10-dimethyl-2,4,6,9-undecatetraene (112 g.) in n-hexane (112 cc.). Stirring was continued for one hour at 10°, and then the mixture was poured onto one liter of ice water. The organic layer was separated, washed neutral, dried and distilled. α-Ionone was obtained in yield of 30.0 g. (32.5%); B.P. 82–85 (0.7 mm.); $n_D^{25}$ 1.496–1.500; 4-phenylsemicarbazone, M.P. 187°.

Example 5

To a well-stirred mixture of 96% sulfuric acid (280 g.) and n-hexane (336 cc.), colled to −10°, was added, during 30 minutes, a solution of 2-acetoxy-6,10-dimethyl-2,4,6,9-undecatetraene (112 g.) in an equal volume of n-hexane. Stirring was continued for 10 minutes at −10°, and then the mixture was poured onto one kg. of ice. The crude product was extracted with petroleum ether, and was washed with 3 N soduim hydroxide and water until neutral. Distillation gave a product of B.P. 84–87° (0.7 mm.); $n_D^{25}$ 1.515–1.519; yield, 27.8 g. (30%). It was identified as β-ionone by a semicarbazone, M.P. 148°, unchanged on admixture with an authentic sample.

In a manner analogous to Example 3, 2-acetoxy-6,9,10-trimethyl-2,4,6,9-undecatetraene (147.7 g.) was treated with 85% phosphoric acid (355 cc.). By working up in the manner indicated in Example 3, there was obtained 80.0 g. (65%) of α-irone; B.P. 94–98° (1 mm.); $n_D^{25}$ 1.497–1.499; 4-phenylsemicarbazone, M.P. 172°, unchanged on admixture with an authentic specimen.

We claim:

1. A process of making a nuclearly unsaturated ionone which comprises treating 2-lower alkanoyloxy-6,10-dimethyl-2,4,6,9-undecatetraene with an acidic cyclizing agent selected from the group consisting of sulfuric acid, phosphoric acid and boron trifluoride.

2. A process of making a nuclearly unsaturated irone which comprises treating 2-lower alkanoyloxy-6,9,10-trimethyl-2,4,6,9-undecatetraene with an acidic cyclizing agent selected from the group consisting of sulfuric acid, phosphoric acid and boron trifluoride.

References Cited in the file of this patent

UNITED STATES PATENTS 2,974,170     Kimel _____ Mar. 7, 1961

OTHER REFERENCES

Wagner et al.: Synthetic Organic Chemistry, p. 169 (1953) (QD 262 W24).